United States Patent
De Sandre et al.

[15] 3,641,329
[45] Feb. 8, 1972

[54] ELECTRONIC COMPUTER KEYBOARD CONTROL

[72] Inventors: Giovanni De Sandre; Gastone Garziera, both of Milan, Italy

[73] Assignee: Ing. C. Olivetti & C. S. p. A., Ivrea (Turin), Italy

[22] Filed: Oct. 24, 1969

[21] Appl. No.: 869,219

[30] Foreign Application Priority Data

Oct. 28, 1968 Italy ....................53652 A/68

[52] U.S. Cl. ....................235/156, 340/172.5
[51] Int. Cl. ....................G06f 7/48
[58] Field of Search....................235/156, 159, 160, 164, 165, 235/167; 340/172.5

[56] References Cited

UNITED STATES PATENTS 3,330,946 7/1967 Scuitto....................235/160
3,469,244 9/1969 Perotto et al....................340/172.5
3,523,282 8/1970 Ragen....................340/172.5

*Primary Examiner*—Eugene G. Botz
*Assistant Examiner*—David H. Malzahn
*Attorney*—Birch, Swindler, McKie and Beckett

[57] ABSTRACT

A control keyboard for an electronic digital machine (computer or calculator) has function keys and number keys. The number keys enter data into a first working register. The activation of any one particular function key of a group of such keys causes an answer corresponding to the ordered function to be placed in the first working register and the contents of the first working register to be transferred to a second working register. A plurality of totalizing registers are operatively connected to the first working register and, in response to the activation of any one of a second group of particular function keys, the number in the first working register is accumulated in one of the totalizing registers associated therewith. A further group of keys is provided which provide a combination of the functions of the first and second keys, and specific functions such a data printout and data exchange.

10 Claims, 10 Drawing Figures

INVENTORS
GIOVANNI DE SANDRE
GASTONE GARZIERA

*INVENTORS*
GIOVANNI DE SANDRE
GASTONE GARZIERA

INVENTORS
GIOVANNI DE SANDRE
GASTONE GARZIERA

INVENTORS
GIOVANNI DE SANDRE
GASTONE GARZIERA

INVENTORS
GIOVANNI DE SANDRE
GASTONE GARZIERA

INVENTORS
GIOVANNI DE SANDRE
GASTONE GARZIERA

IMPROVEMENTS IN ELECTRONIC COMPUTER KEYBOARD CONTROL

The present invention relates to an electronic computer, for example of desk type, provided with a control keyboard comprising numerical keys and function keys.

The electronic computers used in the early stages of the technique were computers of the general purpose type, which were relatively expensive and bulky and not suitable for normal office work, compared with the mechanical desk computers, both for economic reasons as well as reasons of bulk. Attempts have been made to resolve both the problem of cost and that of space, and in the present state of the technique various electronic desk computers of reduced size and operating at a sufficiently high speed are known. However, electronic computers of this type are sometimes still unacceptable either on account of the high cost compared with the number of functions which they can perform or on account of the excessive complexity of their control keyboard, which does not allow their use to be immediately learned and an easy handling requiring little mental intervention of the operator.

Also, in the desk computers of known types, whether mechanical or electronic, there normally exists at least one pair of working registers for separately storing two numbers on which certain predetermined mathematical operations or other functions must afterwards be performed. In some known computers the main working register, directly accessible from the numerical keyboard and therefore also called the input register, requires a special manual operation in order to be cancelled, and hence involves a certain difficulty in operating the keyboard, as it necessitates adequate instruction of the operator and also additional manual steps for the complete performance of mathematical functions.

In one known electronic computer, this problem of operative simplification of the keyboard is solved by means of a circuit so constructed that the input register, into which data are introduced by means of the numerical keyboard, is cancelled whenever a numerical key is activated after carrying out a functional operation. This eliminates the manual operation of cancelling the input register between an arithmetical operation and the insertion of fresh numbers, since, after the performance of a first problem, the operator need only insert into the computer fresh numbers on which operations are to be performed in order to solve a second problem and then activate the necessary function keys.

However, this latter computer has the disadvantage that the insertion of a number, following the performance of a first mathematical operation, necessarily involves the cancellation of the numerical content of the input register, and so, if it is desired to preserve the numerical data registered there, it is necessary to transfer it beforehand to another register by means of a suitable function key. This necessity still makes the use of the computer by a normal operator complicated and difficult, and it also involves intermediate operations between the performance of one arithmetical operation and the insertion of the data for a following operation, in the cases when it is a matter of reusing a number or result of the first operation memorized in the input register.

The object of the present invention is to avoid these disadvantages. According to the invention there is provided an electronic computer with first and second working registers, a control keyboard comprising function keys and numerical keys, whose operation causes corresponding numerical data to be entered in the first register, and a control arrangement such that the operation of a key belonging to a first group of the function keys signifies the end of the entry of data from the numerical keys and establishes that the subsequent operation of a numerical key causes the number in the first register to be cleared therefrom and transferred to the second register.

Preferably the electronic computer also comprises at least one totalizing register and totalizing keys associated therewith and comprised in the said first group of function keys, the operation of a totalizing key either causing the numerical data in the first register to be algebraically accumulated in the corresponding totalizing register and simultaneously preserved in the first register, or causing the numerical data in the corresponding totalizing register and in the first register to be transferred to the first register and the second register respectively, depending upon the designated function of the operated key.

The invention will be described in more detail, by way of example, with reference to the accompanying drawings, in which:

FIGS. 1*a* and 1*b* represent a general diagram of one embodiment of the invention;

GENERAL DESCRIPTION

Structure of the Memory

Figure 1A:
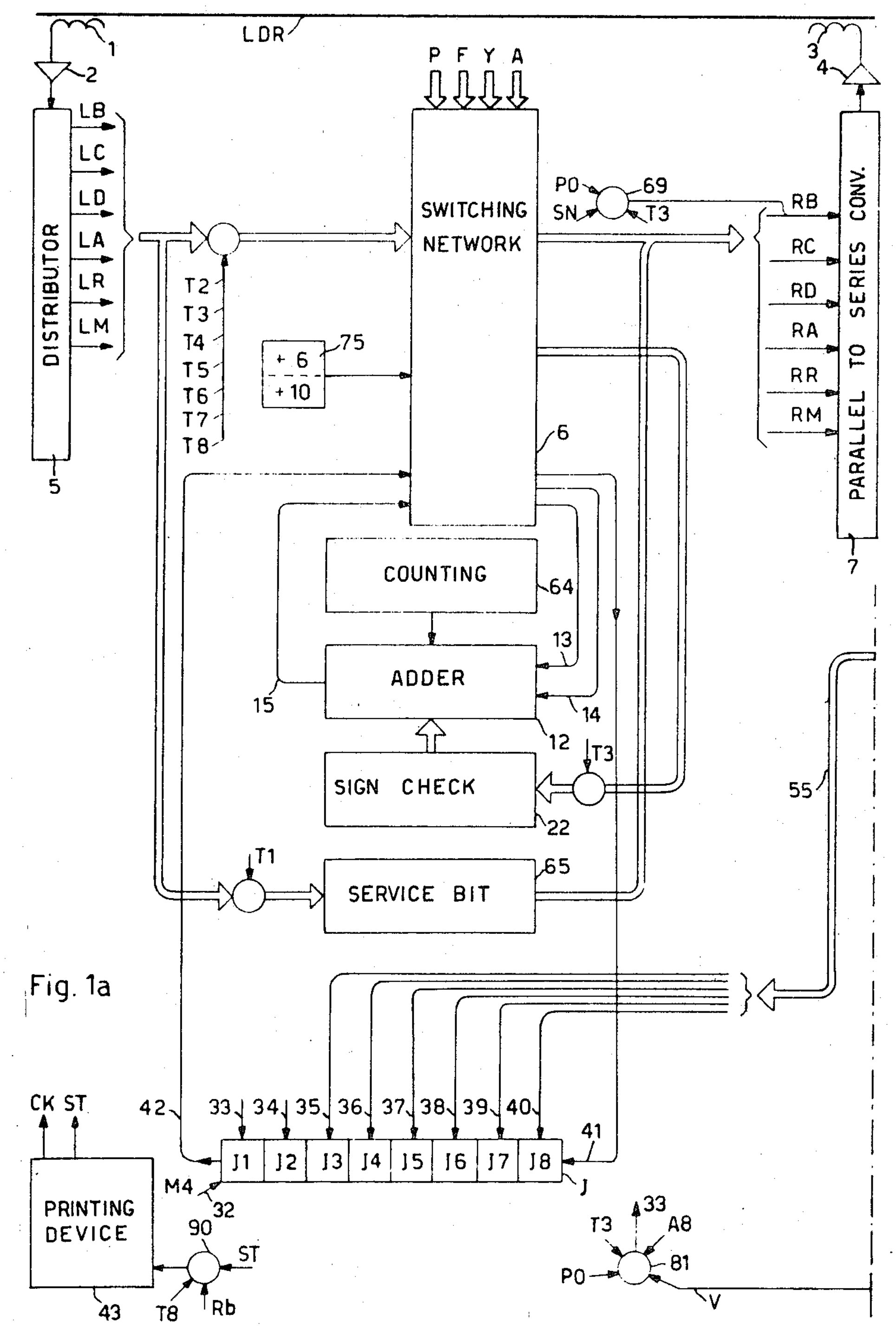

The computer embodying the invention comprises a delay line memory LDR containing, for example, six registers, B, C, D, A, R, M, and provided with a reading transducer 1 feeding a reading amplifier 2 and with a writing transducer 3 fed by a writing amplifier 4.

Each register comprises 24-character positions (C1–C24), each represented in the binary system by means of eight bits, whereby each register is capable of containing up to a maximum of 24 characters of eight bits, both the characters and the bits being processed in series. Consequently $6\times8\times24=1152$ binary signals circulate in the delay line.

The bits belonging to each register are stored in the delay line in interlaced form with the bits of the remaining registers, so that the corresponding bits of the various registers are in contiguous positions in the delay line. The first six binary signals on the delay line therefore represent the first bit of the first character of the registers B, C, D, A, R and M, respectively, the next six binary signals represent the second bit of the first character of the same registers respectively, and so on.

Supposing, for example, that the binary signals are registered in the delay line at intervals of 1.8 microseconds from one another, the signals belonging to a certain register will follow one another at intervals of 10.8 microseconds from one another. In other words, to each register there belongs a train of $8\times24$ binary signals, spaced by 10.8 microseconds from one another, the trains of signals belonging to the different registers being staggered by 1.8 microseconds.

Each character position of the memory LDR can contain a decimal digit and this will thus be called decimal position. Each decimal digit is constituted by eight bits B1–B8, registered respectively in the binary positions T1, T2, T3, T4, T5, T6, T7, T8 of a given decimal position. Of the eight bits which represent a decimal digit, four bits B5, B6, B7, B8 represent the digit in binary-decimal code and are therefore called "digit bits," registered respectively in the last four binary positions T5, T6, T7, T8 of the decimal position. The other four bits B1, B2, B3, B4 have service tasks for the operation of the machine, for which reason they are called "service bits." In particular, the binary position T1 is arranged to contain a service bit B1, which may actually have no connection with the decimal digit contained in the corresponding decimal position of the memory, and which assumes various meanings according to the register in which it is situated and to the operation which is being performed. The binary position T2 is used to contain a significant digit bit B2, which indicates the presence of a significant digit or a zero in the corresponding decimal position of the memory, and the bit B2 is consequently equal to "1" for every one of the significant digits of a decimal number, being equal to "0" in each decimal position not occupied by a digit. The binary position T3 is used to contain a sign bit B3, which defines the algebraic sign of the digit in the corresponding decimal position, and it is therefore equal to "0" for all the digits of a positive decimal number and equal to "1" for all the digits of a negative decimal number. Finally, the binary position T4 is used to contain a decimal point bit B4 which indicates the presence of a point which precedes the digit of the corresponding decimal position, and is consequently equal to "0" for all the digits of a decimal number, except for the first digit after the point.

Figure 3:
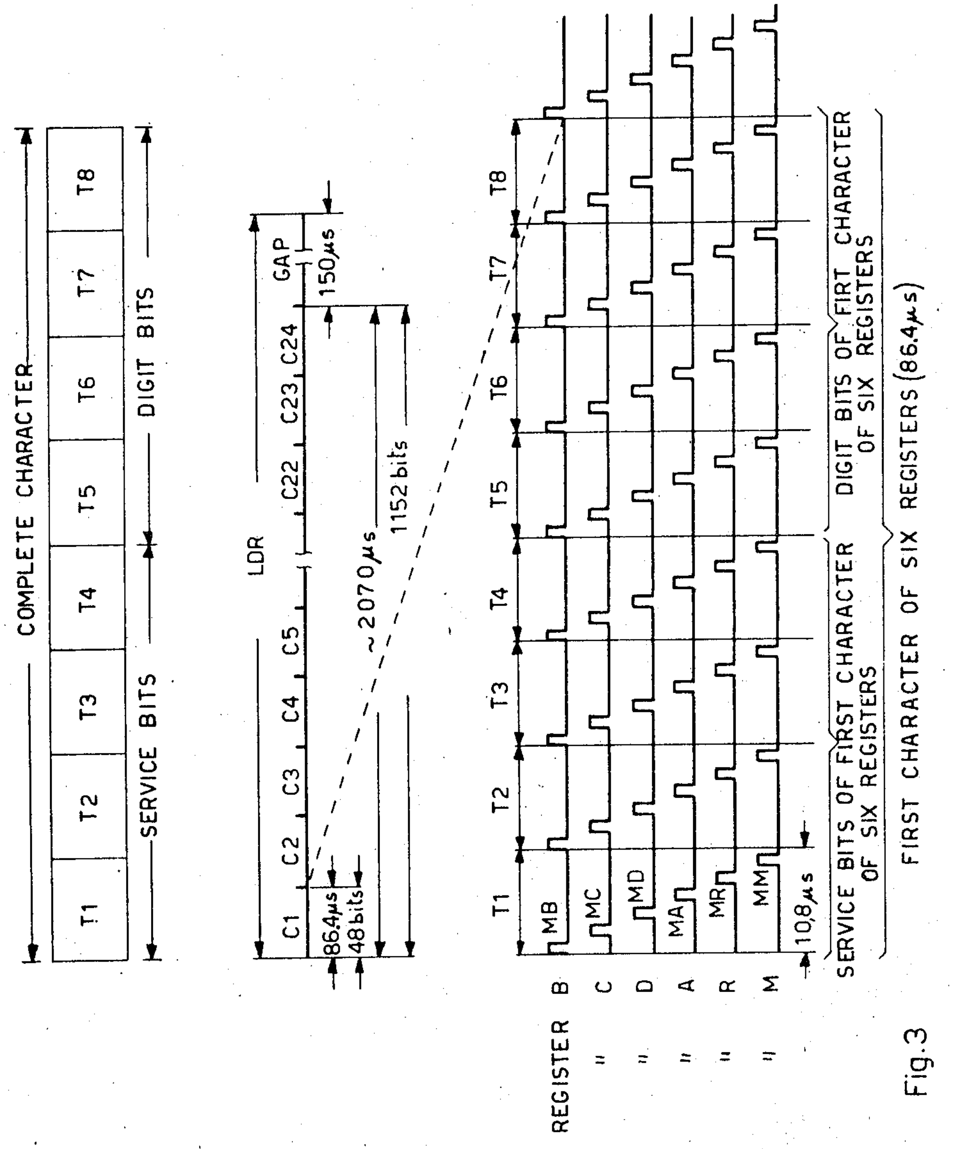
FIG. 3 shows the course in time of some signals present in the computer of FIGS. 1*a* and 1*b;*

Thus the service bits give significance to the digit introduced into the memory, whereas the digit bits give a value to the digit itself. Consequently, the complete representation (in value and significance) of a digit in the memory LDR involves the binary positions T2, T3, T4, T5, T6, T7 and T8 of a given decimal position (FIG. 3).

As previously explained, the computer operates in binary-decimal code, and all the digits inserted into the memory must therefore be expressed in or converted into such a code. Also, each register can contain at maximum 24 decimal digits in the decimal positions C1–C24 but the number which can be inserted in a register can have at maximum 22 significant decimal digits, inserted in the decimal positions from C1 to C22, the remaining decimal positions C23 and C24 being reserved for the insertion of the carry digits which may be produced during the performance of an operation.

As previously mentioned, the memory can contain in all 1,152 bits and, as one is succeeded by the other at intervals of 1.8 microseconds, they occupy an interval of approximately 2,070 microseconds in the line. When all the bits have been inserted in the line LDR, a space called a cue or gap, lasting for approximately 150 microseconds, still remains vacant; therefore, the delay of the line, namely the time which is required by a bit to traverse it entirely, is approximately 2,220 microseconds. The output of the reading amplifier 2 feeds a series-parallel converter or distributor 5, which comprises a temporary reading memory in which the pulses successively issuing from the delay line are memorized then to be transferred in order to a reading staticizer which is capable of making available at the same time the six binary signals relative to the six registers of the memory LDR on six separate outputs LB, LC, LD, LA, LR and LM respectively, whereby the signals representing the first bit of the first decimal position of all six registers are present together at a given moment on the said outputs; 10.8 microseconds later the signals representing the second bit of the first decimal position are present together on the said outputs, and so on.

Each group of six binary signals present in parallel on the outputs of the converter 5 is transmitted, after having been processed or not, to a parallel-series converter 7 on six separate and corresponding inputs RB, RC, RD, RA, RR and RM respectively. The converter 5 comprises a temporary writing memory in which the binary signals supplied to its inputs RB, RC, RD, RA, RR and RM are temporarily memorized, to be then supplied to the writing amplifier 5, arranged once more in series and spaced by 1.8 microseconds, whereby the transducer 3 registers the said signals in the memory LDR, possibly modified according to the operations completed by the computer with respect to their original relative arrangement. It is thus evident that the single delay line LDR corresponds, as regards the external circuits which process its content, to a total of six delay lines operating in parallel, each containing a single register and provided with an output LB, LC, LD, LA, LR and LM respectively and with an input RB, RC, RD, RA, RR and RM respectively.

The described arrangement of the signals in the delay line allows all the registers of the computer to be arranged in a single delay line, with a single reading transducer and a single writing transducer, and thus at a cost not much higher than that of one delay line which might contain a single register. In addition, since the repetition frequency of the impulses in the delay line is six times higher than in the processing circuits of the computer, it is possible to derive at the same time a good exploitation of the memory capacity of the delay line while using in the processing members switching circuits which are slow and thus not very expensive.

Given the cyclic structure of the delay line memory, the functioning of the computer is subdivided into successive memory cycles, each cycle comprising 22 digit periods from C1 to C22, each digit period being subdivided into eight bit periods from T1 to T8, and each bit period being subdivided into six impulse periods M1, M2, M3, M4, M5 and M6 respectively for the six different memory registers B, C, D, A, R and M respectively.

The registers B, C, D, A, R, M are all numerical registers and, as will be explained hereinafter, the registers A, R and M are working registers, while the registers B, C and D, also called totalizers, serve for the storage of data.

TIMING

A time signal generator 8 (FIG. 1*b*) supplies on the outputs from T1 to T8 successive time impulses, the duration of each of which singles out a corresponding bit period, as indicated on the timing diagram in FIG. 3. In other words, the output T1 is activated during the entire first bit period of each of the 22 digit periods C1–C22, the output T2 is activated during the entire second bit period of each of the 22 digit periods, and so on.

The time signal generator 8 is synchronized with the delay line 8, as will be seen hereinafter, in such a manner that the start of the *n*th generic bit period of the *m*th digit period coincides with the moment when on the outputs of the distributor 5 there begin to be available the binary signals representing the six bits read in the *n*th binary position of the *m*th decimal position of the six memory registers. These binary signals which are read last for the entire corresponding bit period. In the course of the said period, the bits are transmitted to the parallel-series converter 7 and the six bits resulting from the processing of the six bits are then registered in the delay line LDR.

In particular, the generator 8 is capable of supplying six pulses M1, M2, M3, M4, M5 and M6 (FIG. 3) during each bit period. The impulse M1 defines the moment of reading when the temporary reading memory of the distributor 5 starts to receive the binary signals MB, MC, MD, MA, MR and MM relative to the present bit period, while the impulse M6 signalizes the moment when the binary signals are all staticized in the staticizer of the distributor 5 and are therefore simultaneously available on the outputs LB, LC, LD, LA, LR, LM.

The impulse M1 also determines the moment of writing when the binary signals staticized in the staticizer of the distributor 5 during the preceding bit period are transmitted to the temporary writing memory of the parallel-series converter 7 in order to be written serially in the delay line LDR.

The generator 8 is constituted by an oscillator 9 which supplies impulses with the frequency of the impulses M1–M6, i.e., with a period of 1.8 $\mu s$ to an impulse distributor 10 which supplies successive pulses on its outputs from M1 to M6, and also by a frequency divider 11, fed by the distributor 10, adapted to supply successive pulses on its outputs from T1 to T8.

The oscillator 9 remains activated only while a flip-flop A10 (FIG. 5) is set, which is controlled, in a manner appearing hereinafter, by signals registered in the delay line LDR.

The flip-flop A10 is set from the beginning of the signal AG generated by the operator when he presses a corresponding starting button of the machine. The pulse generator 9 is therefore also set in motion. Furthermore, the beginning of the signal AG causes, through a special control circuit, the writing of a service bit B1B = "1" in the first binary position (bit period T1) of the first decimal position (digit period C1) of the first register B in the line LDR.

The time signal generator then scans the successive digit periods from C1 to C24 which are counter by a special counter until, at the impulse T1 of the 24th digit period, the said control circuit causes the writing of a service bit B1M = "1" in the bit period T1 of the 24th digit period of the last register M. The flip-flop A10 in the bit period T8 of the 24th digit period is also reset by the impulse M6, whereby the oscillator 9 and thus the generator 8 are stopped. Therefore, in the initial starting stage of the machine two synchronizing bits are written in the delay line LDR at the beginning and at the end of a series of 24 digit periods, the start bit being registered in the register B and the end bit in the register M. These synchronizing bits provide for the synchronization of the generator 8 with the delay line itself, so as to compensate for possible variations in the propagation time of the pulses along the line and variations in the period of the oscillator.

With this object, in all the memory cycles following that in which the synchronization bits have been registered and whatever the actual state of the machine may be, the reading signal LB1B of the bit B1B sets the flip-flop A10 and the reading signal LB1M of the bit B1M deactivates it, whereby the generator remains in operation precisely for 24 digit periods in each memory cycle. This ensures that all the registers of the delay line contain exactly 24 digit periods, regardless of any phase drift which can be caused between delay line and generator in the course of a single memory cycle, a drift which is immediately offset by the fact that in the regeneration of the bits B1B and B1M the moment of rewriting is exactly controlled by the timing impulses produced by the generator itself.

It is therefore clear that the effective length of the delay line, corresponding to the propagation arate of an impulse between the two transducers 3 and 1 increased by the processing time elapsing between the moment of reading M1 and the next moment M1 of rewriting of the said impulse, has to be greater than the length of the registers corresponding to 24 digit periods of the generator 8; whereby the train of 6×8×4=1,152 signals which are propagated along the line LDR leaves free a part of the length thereof depending upon the difference between the said two lengths. Consequently, each memory cycle which commences with the reading of the bit B1B continues for 24 character intervals plus an interval plus an interval of dead time corresponding to the said difference in lengths.

ARITHMETICAL ELEMENTS

Figure 4:
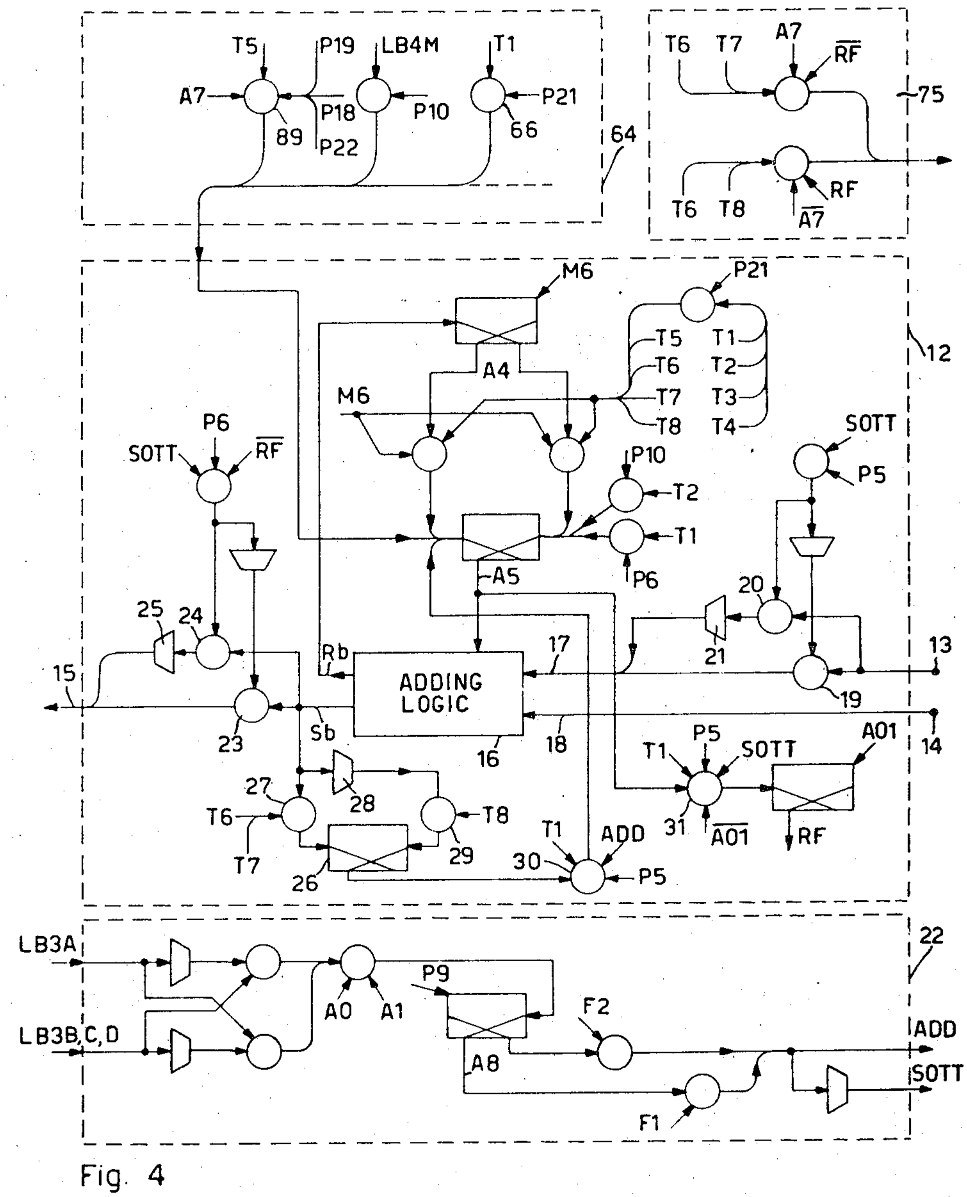
FIG. 4 represents an adder included in one embodiment of the invention, and some circuits associated with it.

The computer also comprises a binary adder 12 provided with a pair of inputs 13 and 14 capable of receiving simultaneously two bits to be added in order to supply the sum bit simultaneously on an output 15. In particular, in the embodiment illustrated in FIG. 4, the adder comprises a logical network for binary addition 16, capable of supplying on the output S*b* and R*b* the binary sum and carry bits respectively resulting from the sum of two bits supplied simultaneously to the two inputs 17 and 18, and the binary carry bit, resulting from the sum of the preceding pair of bits, supplied by a flip-flop for carries A5. The two addend bits last from the timing impulse M1 to the impulse M6 of the relative bit period, and the bit for addition S*b* and for actual carry R*b* are simultaneous with it. The preceding carry bit is staticized in the flip-flop A5 by the impulse M6 of the preceding bit period until the impulse M6 of the current bit period. The actual carry bit R*b* is transferred into a flip-flop A4, in which it remains staticized until the impulse M6, the impulse M6 providing for its transfer into the flip-flop A5, in which it then remains staticized for the entire following bit period, so as to enable the feeding of the addition network 16 during the addition of the following pair of bits.

The input 13 of the binary adder can be connected to the input 17 of the addition network 16 either directly through a gate 19, or through a gate 20 and an inverter 21. It is therefore clear that in the first case each decimal digit is introduced unaltered into the adder and that, on the contrary, in the second case, the digit being represented in binary code, there is introduced into the adder the complement with respect to 15 of the figure. The opening of the gates 19 and 20 is controlled by a signal SOTT, produced by a checking circuit 22 for the sign bit, the structure of which will be described hereinafter.

The output Sb of the addition network 16 can be analogously connected to the output 15 of the adder either directly through a gate 23, or through a gate 24 controlled by the signal SOTT and an inverter 25 which complements with respect to 15 the decimal digit present at the output S*b*.

A flip-flop 26 is adapted to be set through a gate 27 by each bit equal to "1" present on the output S*b* of the addition network 16 in the bit periods T6 and T7 and to be reset through an inverter 28 and a gate 29 by each bit equal to "0" present on the output S*b* in the bit period T8. Consequently, the sum of a pair of decimal digits in the generic *n*th digit period C*n* having been concluded, the fact that the flip-flop 26 remains activated after the bit period T8 of the digit period signifies that the sum digit is greater than 9 and less than 16, whereby there is a decimal carry to be transmitted into the next decimal position. Through a gate 30, the output of the flip-flop 26, indicating the decimal carry, is transmitted to the flip-flop for carries A5, which provides for the transmission of the carry to the addition network 16 in the next digit period *C*(*n*+1).

A decimal carry is also transmitted to the next decimal position if, during the bit period T8 of the present digit period C*n*, there occurs a binary carry R*b*, in so far as that signifies that the total digit is greater than 15. The transmission of the decimal carry is in such a case ensured by the flip-flops A4 and A5 in the manner already seen.

Consequently, in each case the fact that the flip-flop A5 is set following the bit period T8 of the digit period C*n* signifies that there is a decimal carry to be transmitted from the digit period C*n* to the following digit period *C*(*n*+1).

If the said digit period C*n* is that in which the last digit is read, i.e., the most significant of those of the two numbers to be added, the decimal carry is transmitted through a gate 31 to a flip-flop RF, which therefore, when it is set indicates the existence of a final carry originating from the pair of more significant digits.

The adder 12 is controlled by the checking circuit 22 for the sign bit B3 of the two registers concerned. In case of the signs disagreeing, a flip-flop A8, which had originally been set, is reset. Thus the fact of the flip-flop A8 being or not being set from a certain moment onward signifies that the two signs examined are equal or not. It is clear that the output ADD of the circuit 22 is activated if, the flip-flop A8 being set, an adding instruction represented by F1 is present, or else the flip-flop A8 being reset, a subtraction instruction represented by F2 is present.

The computer is also provided with a shift register J, comprising eight binary stages J1–J8. The register J, of a type known per se, is so constructed that whenever it receives a command impulse for the shift on a terminal 32, the bits contained in the stages J2, J3, J4, J5, J6, J7, J8 are transferred into the preceding stages J1, J2, J3, J4, J5, J6 and J7 respectively, and in addition the bits present on the inputs 33, 34, 35, 36, 37, 38, 39, 40, 41 are transferred into the stages J1, J2, J3, J4, J5, J6, J7, J8 and again J8 respectively. The pulses commanding the shift are formed by the impulses M4, and the register J therefore receives one of them in each bit period, i.e., eight in each digit period. The contents of each stage of the register J remain unchanged from the impulse M4 of each bit period until the impulse M4 of the following bit period. Consequently, it is evident that a bit present at the input 41 of the register J during a certain bit period will reemerge at the output 42 of the register after eight-bit periods, i.e., delayed by one-digit period, whereby the register J acts in such a case as a delay line section of a digit period.

The connecting of a generic memory register X to the register J in a closed ring, leaving the other registers closed directly on themselves, is equivalent to lengthening the register X by one digit period compared with the other memory registers. As it is appropriate again to define as the *n*th decimal position of the register J that which is read simultaneously with the *n*th decimal position of the other registers, i.e., during the *n*th digit period commencing from the reading of the start bit B1B = "1" of the generator 9, it is clear that the contents of the register X will then, at each memory cycle, undergo a shift by one decimal position, i.e., a delay by one digit period compared with the other registers.

The register J, in so far as it functions as a delay lieu, is also capable of constituting a counter, according to the principles expounded on page 198 of the book "Arithmetical Operations in Digital Computers," by R. K. Richards, D. Von Nostrand Company, Inc., 1955, whenever its input 41 and its output 42 are connected respectively to the output 15 and to the input 13 of the adder 12, and the input 14 of this latter receives no signal, the counter being capable of counting successive counting pulses transmitted to the flip-flop for the carries A5 by a counting control circuit 64 (FIGS. 1*a* and 4) with the criterion hereinafter specified. Considering the eight bits contained in the register J as belonging to a number of eight binary positions, a counting impulse can be transmitted to the flip-flop A5 at the moment when the bit of least significance emerges from the register J. The counting pulses will therefore have to follow one another at a distance of one digit period or of a multiple of the digit period.

The register J is also capable of functioning as a transfer memory in order to contain temporarily a decimal digit, or the address of a totalizing register, or else an instruction which the machine has to carry out for the purpose of commanding a printing device 43 to print the digits or the address or the instruction, in a manner which will be described hereinafter.

Finally, the register J is capable of functioning as a parallel-series converter in the transfer of data from an input member to the memory LDR, as will be seen hereinafter.

A switching network 6, of a type known per se, is capable of interconnecting in various ways, specified hereinafter, the memory registers, the adder 12 and the register J with the object of controlling the transfer of data and instructions between the various members. It is thus evident that the switching network 6 is also entrusted in particular with the task of the selection of the registers in the manner which will be explained hereinafter.

A control circuit 65 (FIG. 1*a*) for the service bits B1 effects the regeneration and the modification (i.e., shifting) of the service bits for the various registers.

INPUT MEMBERS

The input member of the computer is formed of a keyboard 44 for the introduction of the data and the control of the various functions of the computer. The keyboard 44 comprises a numerical keyboard 45, provided with ten numerical keys 0–9, by means of which it is possible to introduce a number, through the register J, into the operating register A which is the only one directly accessible from the numerical keyboard among the registers of the memory LDR. In addition, a decimal point key 47 and a negative algebraic sign key 46 directly produce a binary signal on line V and SN respectively.

The keyboard 44 also comprises a keyboard 48 for the totalizing registers B, C, D, provided with function selection and totalizer address (selection) keys F*B, F*C, F*D: F◇B, F◇C, F D: F+B, F+C, F+D: F–B, F–C, F–D, each of which corresponds to a specific function *, ◇, +, –, among those which the computer can perform and also commands, besides the performance of that specific function, the selection of a totalizing register B, C, D of the memory LDR, on which it acts in the performance of the function.

The keyboard 44 finally comprises a function operations keyboard 49, provided with operative keys "×," "," "□," "%," "√‾," "P," "Q," "R," "<," each of which corresponds to a particular function which the computer can perform, plus a key " {| " for connecting with the second totalizing register C, which can be activated immediately prior to or together with one of the function keys "×," "," "%," "P," "Q," "<."

The three keyboards 45, 48 and 49 control a mechanical decoder known per se, provided with code bars associated with electrical switches, which are capable of supplying correspondingly on four lines H1, H2, H3, H4 as many binary signals representing the four bits of the decimal digit inserted on the keyboard 45, or on the said lines H1, H2, H3, H4 as many binary signals representing collectively a function, and on two other lines H5 and H6 two binary signals representing the address of the totalizer on which it performs the said function inserted on the keyboard 48, or else on the lines H1, H2, H3, H4 the binary signals representing the function inserted on the keyboard 49, the decoder being also adapted to energize the line G1 in order to indicate that the insertion has been effectively performed on the keyboard 45, the line G2 to indicate that the insertion has been made on the keyboard 48, and the line G3 to indicate that the insertion has been made on the keyboard 49.

In the example illustrated, the functions which the computer can perform are, (Y indicating the generic totalizing register corresponding to the address specified in the function instruction);

F*Y) Printing with zeroing: transfers into the operating register A the number contained in the selected totalizing register Y and zeros this totalizing register and at the same time transfers into the operating register M the number contained in the operating register A, then prints the contents of the register; namely in symbolic form (Y)→A and (A)→M;

F◇Y) Printing without zeroing; analogously Y → A and A → M, without zeroing the selected totalizing register Y;

F+Y) Addition; forms the algebraic sum of the number contained in the operating register A with the number contained in the selected totalizing register Y, then registering the result in the totalizing register and preserving in the register A the number originally contained: i.e., (Y)+(A) → Y;

F–Y) Subtraction; performs the algebraic subtraction analogously to the case of addition; i.e., (Y)–(A)→ Y;

F×) Multiplication; performs the multiplication of the operands contained in the registers A and M and registers the result in A transferring at the same time into M the operand originally contained in A; i.e., (M)×(A) → A and (A) → M;

F) Division; analogously (M)(A) → A and A → M;

F□) Square; forms the square of the number contained in the operating register A and registers the result in A, transferring the original contents of A into M; i.e., □(A) → A and (A) → M:

F√‾) Square root; forms the square root of the number contained in the operating register A and registers the result in A; i.e., √‾(A)→ A;

F%) Percentage discount or premium, performs the complete calculation of the discount or of the premium with respect to the total originally inserted (and actually in M) according to the negative or positive percentage afterwards inserted (and actually in A), so as to obtain in A first the amount of the discount or premium and finally the amount discounted, preserving the original total in M; i.e., (A)%(M) → A;

F Σ P) Totaling of the products: the operation is analogous to that of the function F× with, in addition, an algebraic totaling of the product in the totalizing register D; i.e., (M)×(A) → A, (M)×(A)+(D) → D;

F Σ Q) Totaling of the quotients: the operation is analogous to that of the function F with, in addition, an algebraic totaling of the quotient in the totalizing register D; i.e., (M)(A)→ A, (M)(A)+(D) → D;

F<) Designation of the prime term: this key, activated after the insertion of a number in the register A, defines the import thereof by designating it as the prime term for a successive function operation and performing the printing thereof: activated, on the contrary, without a previous insertion, it effects the exchange of contents between the registers A and M, i.e., (A) → M, and (M) → A, then performing the printing of the final contents of the operating register A;

FR) Transfer from the working register R: this key effects the transfer into the operating register A of the number contained in the working register R and the ensuing printing of this number.

It must be observed that some of the functions mentioned above, besides carrying out at all times the printing of the result of the operation, contained in the operating register A, command also the printing of the last operand inserted and of intermediate results.

The key for connecting with the totalizing register C included in the keyboard 49 is capable of designating the number contained in the totalizing register C as second operand, simulating to all effects an insertion by keyboard of the second operand by the keyboard; activated therefore together or in sequence with the function keys "×," "," "%," "P" and "Q," it first performs a transfer of the number contained in the totalizing register C to the operating register A and then the functional operation specified by the function key selected. If, on the contrary, the key for connecting with the totalizing register C is activated together or in sequence with the key designating the prime term, it commands the zeroing of the totalizing register C and the transfer into it of the number contained in the operating register A, leaving the content of the latter unaltered.

The computer is also provided with a staticizer 50, comprising six binary stages I1–16, of which the first four I1–I4 can contain the four bits of a decimal digit of an instruction, while the stages 15 and 16 can contain the address bits of the instruction, if present.

The first four stages I1–I4, when they contain the four functional bits of an instruction, feed a functions decoder 51, provided with outputs F1–F13, each of which is energized when the four bits represent the corresponding function. The remaining two stages 15 and 16, containing a pair of address bits of the said instruction, feed an address decoder 52, provided with three outputs Y1–Y3, each of which corresponds to one of the three totalizing registers which can be addressed and is energized when the said two bits represent the address of the said totalizing register. When no address is specified, the working register A is automatically selected.

The outputs of the stages I1–I4 and the outputs of the stages I5, I6 can also be connected through a gate 53 and a gate 54 respectively and connecting line 55 to the inputs of the stages J3–J8 respectively of the register J, with the object of transferring into the register J and then to insert into the operating register A the decimal digit inserted, or with the object of printing the function, and respectively the address contained in these stages.

The keyboards for the totalizers 48 and for the functions 49 have a structure which allows the operator to insert a sequence of operations into the computer and to have them subsequently performed by it.

In order to perform a functional operation the operator manually keys in a function, possibly accompanied by an address, and these, through a gates 56 and 57 respectively staticized in the staticizer 50. This keying in the keyboard also starts, as will be seen, an executive phase for the instruction thus inserted, at the end of which the computer stops.

As has already been mentioned, if no address is selected by the operator, the register A is automatically selected, which, on the other hand, as has also been stated, is that which receives the data inserted on the numerical keyboard 45. The operations inserted without any accompanying address (i.e., ×, ,□ , %,$\sqrt{\phantom{x}}$) are performed on the data contained in the operating registers A and M; while, if a particular totalizing register is selected (on the keyboard for the totalizers 48 or on the functions keyboard 49 by means of the key for connecting with the second totalizing register C), its numerical content is concerned as an operand for the performance of the operation inserted. Consequently, each functional operation corresponding to the key depressed in the keyboard 49 can be performed either on a number inserted immediately before on the numerical keyboard 45 and registered in the operating register A, or on a number transferred immediately before from one of the totalizing registers B, C, D to the operating register A by means of the totalizing register 48, or else on the number contained in the totalizing register C if this is selected by means of the key " || " on the functions keyboard 49 (and in this latter case the selection of the totalizing register C by means of the key " \\ " is equivalent to a recall of the number contained in the registered C into the operating register A).

CONTROL UNIT

Figure 1B:
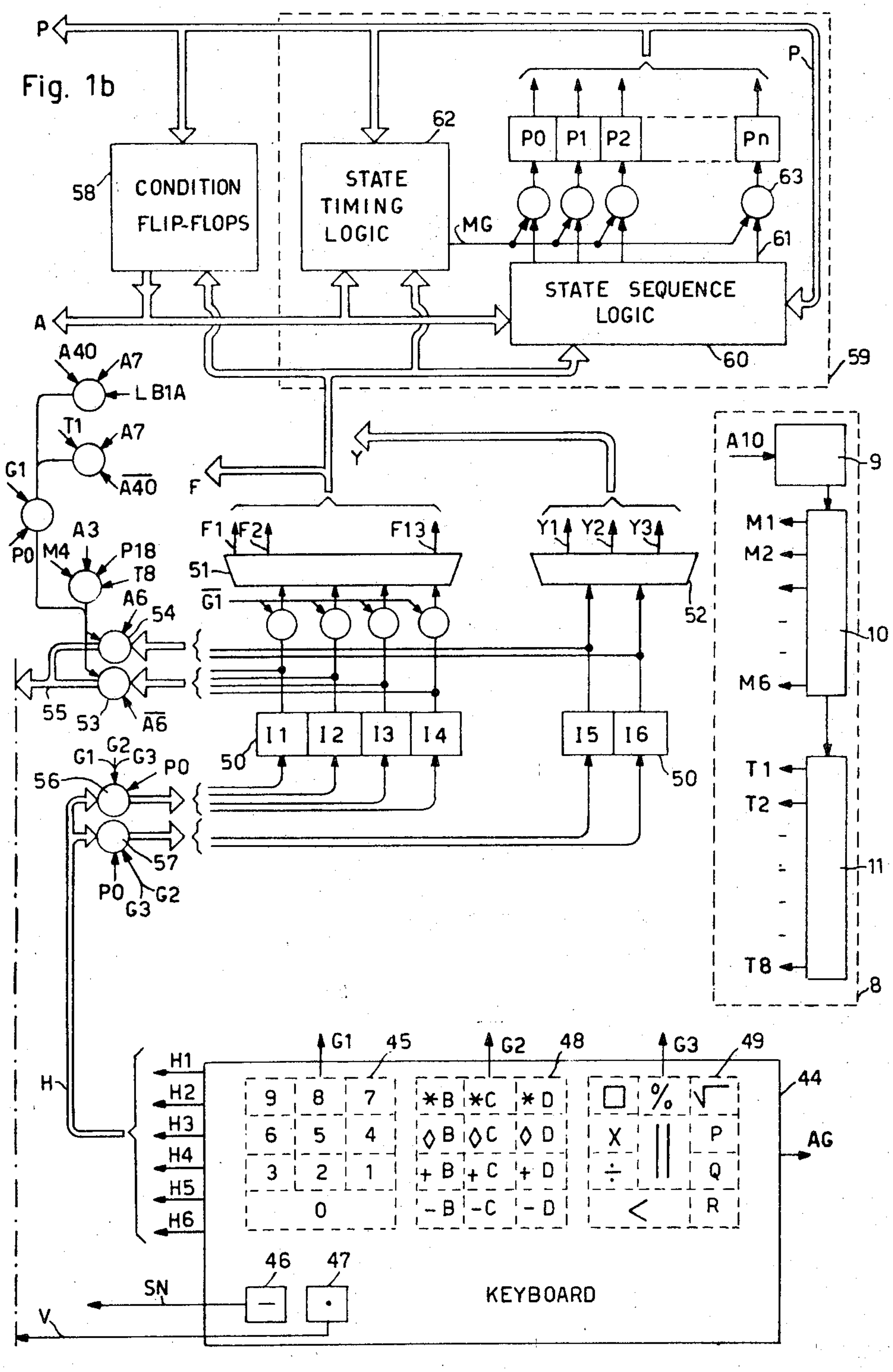
Figure 2:
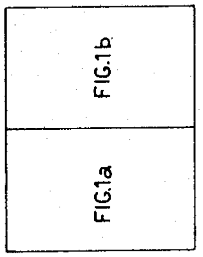
FIG 2 shows FIGS. 1*a* and 1*b* put together.
Figure 5:
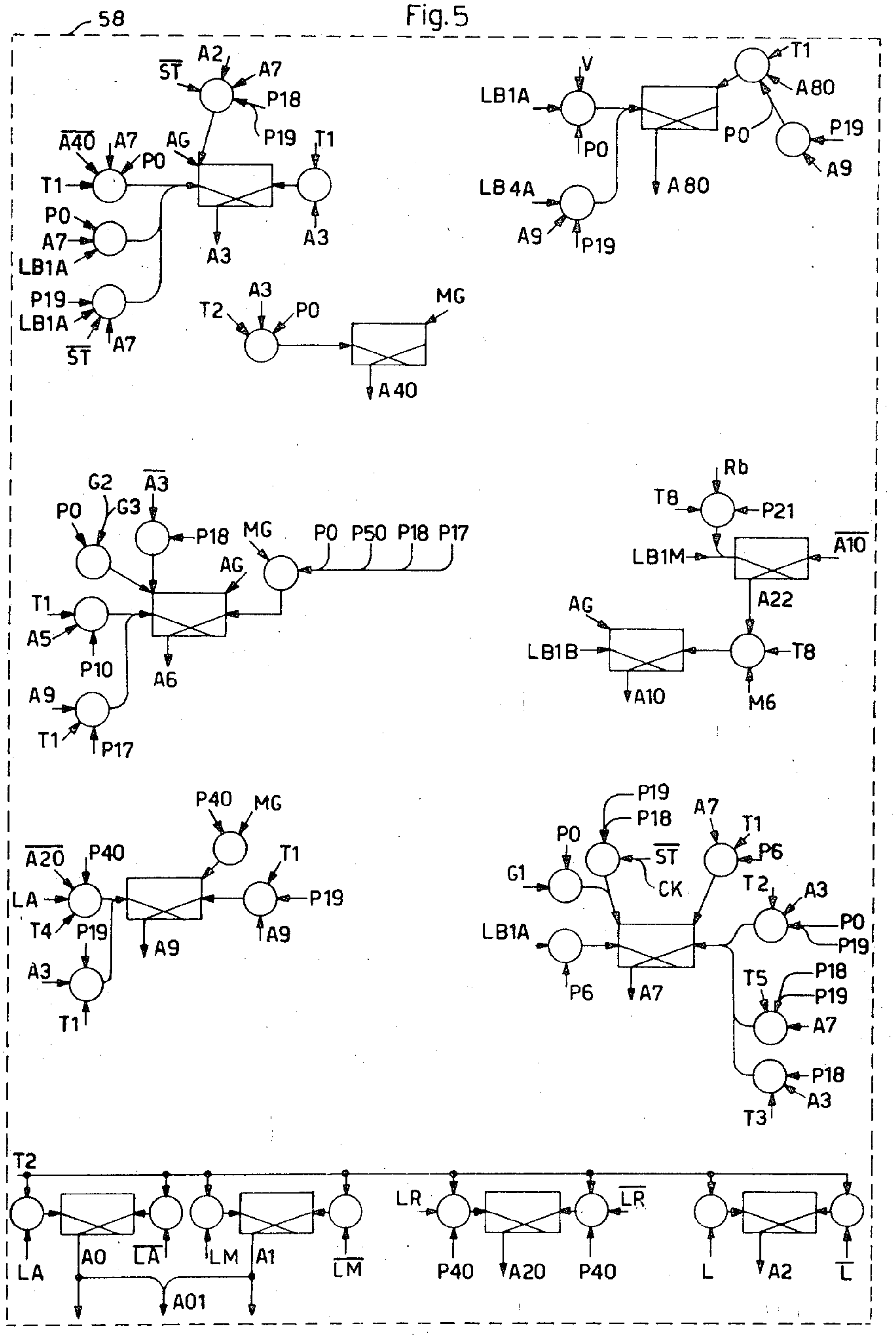
FIG. 5 represents a group of flip-flops of the computer according to FIGS. 1*a* and 1*b;*
Figure 7:
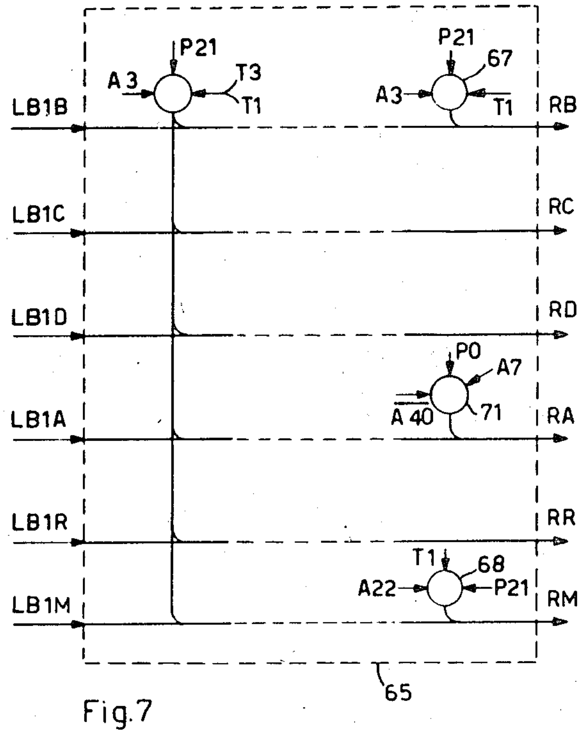
FIG. 7 represents a checking circuit for the service bits used in the computer.
Figure 6:
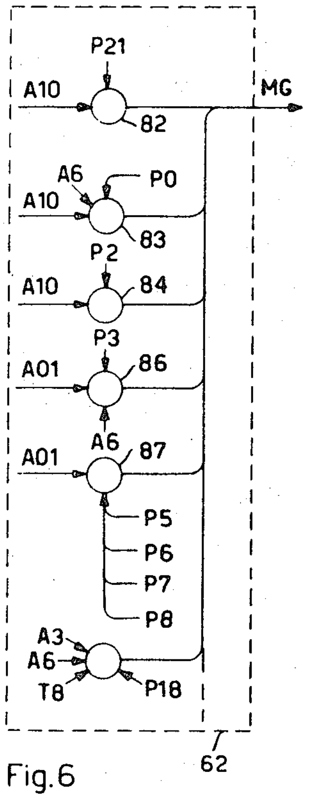
FIG. 6 represents in part the timing circuit for the sequence of states of the computer.

The computer is also provided with a group of internal conditions flip-flops, collectively represented by the clock 58 in FIG. 1*b* and in detail in FIG. 5.

The flip-flop AO is set, in each memory cycle, at the first bit period T2 in which the digit bit B2 read in the register is equal to "1" and is reset at the first bit period T2 in which the digit bit read is equal to "0," and thus remains set for the whole time in which the reading of the number contained in the register A continues. In other words, the flip-flop AO signalizes in the ambit of each memory cycle the length and the position of the number contained in the register A.

The flip-flops A1 and A2 have an analogous function respectively for the register M and for the selected totalizing register Y, the flip-flop A1 being controlled by the output LM from the register M and the flip-flop A2 being controlled by the output L from the register selected. The outputs of the flip-flops A0 and A1 are combined to give a signal A01 which lasts, in each cycle, from the reading of the first of the digits of the numbers A and M to the reading of the last of the digits of the numbers A and M.

The flip-flop A3 is used in general for distinguishing a certain digit period during which a definite operation is completed, remaining set during the said digit period, and reset during the remaining ones.

The flip-flop A7 is used in general for distinguishing a certain memory cycle from the following cycles during the operations in which the input 44 (keyboard) and the output units 43 (printer) are involved. The flip-flops A6 and A9 indicate the occurrence of certain conditions in the course of the performance of a certain instruction.

The computer is also provided with a sequence control unit 59, comprising a group of state flip-flops P0, P1, P2–P*n*, which can be set one at a time, whereby the computer is at each moment in a well defined state, corresponding to the flip-flop P0 to P*n* actually set. The operation of the computer involves the passage through a certain sequence of states, in each of which a certain elementary operation is completed.

The criteria according to which the states follow one another is determined by a logical network 60, known in itself, which, based on the knowledge of the actual state, supplied to it by the flip-flops P0 to P*n* through a line P, of the instruction actually staticized, supplied to it by the decoder 51 through the line F, and of the actual internal conditions of the machine, supplied to it by the condition flip-flops 58 through the line A, decides what the future state must be energizing that one of its outputs 61 which corresponds to the said future state. When a logical network 62 then produces a timing impulse MG for the passage of state, the state flip-flop corresponding to the said future state is set through the gate 63 corresponding to the said output 61, while all the other state flip-flops are reset.

PRINTING DEVICE

The printing device 43 comprises a cylinder-carrying characters maintained in continuous rotation, provided with as many rows of characters as reading columns are possible to it, each row being arranged on an arc of circumference so as to leave an arc free from characters. A hammer normally fixed in the position of rest on the right of the first row of characters, is adapted to complete successive steps parallel to the axis of the cylinder in synchronism with the rotation of the cylinder so as to be aligned with the successive printing columns, for the purpose of printing one after another the characters of a row.

Each row of printing comprises a number with a point, provided on its left with the relative algebraic sign and on its right with a character forming the symbol of the operation completed on it and with a character indicating the register from which the number has been extracted during the printing. Consequently the first row of characters comprises the characters B, C, D and R (the register A is identified by the presence of no character), the second row comprises operating symbols contained in the totalizing keyboard 48 and the functions keyboard 49, and the rows commencing with the third are alike and comprise the ten decimal digits, the point and the algebraic sign "—."

The characters are so arranged so that, if the corresponding bits B5, B6, B7, B8 which represent them in the internal code of the machine are interpreted as representations of the numbers from 0 to 15 in simple binary code, the successive characters which appear beneath the hammer in each column correspond to numbers decreasing from 15 to 0, and so that the characters in the various rows aligned on the same generatrix of the cylinder correspond to the same number. Consequently, in the ambit of each row the characters can be distinguished simply by means of a count.

Integral with the cylinder is a generating disc for timing signals which, in a manner known in itself, cooperates with an electric circuit to generate a signal CK shortly before the moment when each character of the cylinder arrives in reading position opposite the hammer. The said circuit is also adapted to generate a signal ST which at each memory cycle lasts for the whole of the time when the arc occupied by the characters is opposite the hammer, whereby the absence of the signal ST denotes that fraction of revolution of the cylinder used for the shift of the hammer to the following column and for the extraction from the memory LDR or from the staticizer 50 of the next character to be printed. This fraction of revolution lasts for at least some memory cycles.

The operation of the machine in some of its states, i.e., in the performance of some basic operations, will now be described.

OPERATION OF THE COMPUTER

Starting State of the Machine

When the mains switch is closed, the machine commences operating, but the flip-flops are set arbitrarily, the keyboard is block, the magnetostrictive delay line is vacant and the timing is stationary.

A setting pushbutton AG must therefore be pressed, which causes two mechanical cycles, during which there occurs the setting of the state flip-flops in a definite state, the starting of the timing and the insertion in the line of the reference bits B1 in the first binary position of the register B; B2 and B4 (i.e., respectively a bit "0" which denotes the absence of a significant digit and a bit "0" which denotes the absence of point) in the binary positions T2 and T4 of the first decimal position C1 of all the registers, and B1 in the first binary position of the 24th decimal position C24 of the final register M. The button AG also causes the mechanical unblocking of the keyboards.

The operation of the button AG causes in particular the resetting of the flip-flops A6 and A10, puts the machine into the state P21 and also sets the flip-flop A10, whereby the pulse generator 9 is set in motion in the manner previously described.

In addition, the operation of the pushbutton AG causes the writing in the stages J1–J8 of the register J of the bits collectively representing the complement to 256 of the number 23.

In the state P21, the switching network permanently connects the adder 12 and the register J to form a counter in the manner already stated, and the counting pulse control circuit 64 produces a counting pulse through a gate 66 at each digit period in the bit period T1, whereby the counter is adapted in this state to count the successive digit periods, in so far as its contents increase by one unit at each digit period.

The start of the signal AG also sets the flip-flop A3, which is then reset at the bit period T1 immediately following, i.e., it remains set only during the first bit period. The control circuit 65 for the service bits therefore provides, through a gate 67, for writing a service bit B1B = "1" in the first binary position (bit period T1) from the first decimal position (digit period C1) of the register B, and also for writing a bit B2 = "0" in the second binary position (bit period T2) of the first decimal position C1 of all the registers, and a bit B4 = "0" in the fourth binary position (bit period T) of the first decimal position of all the registers.

The counter counts the successive digit periods until its contents, at the impulse T1 of the 23rd digit period C23, reaches the value 256, which circumstance is revealed by the existence of a binary carry R*b* during the bit period T8 of the said digit period. A flip-flop A22 is therefore set, which remains set during the 24th digit period C24. Under its control in the circuit 65 a gate 68 is opened to write a service bit B1M = "1" in the bit period T1 of the 24th digit period of the register M.

In addition, in the bit period T8 of the 24th digit period the flip-flop A10 is reset by the impulse M6, whereby the generator 8 stops.

In the state P21, therefore, the two synchronization bits are written at the beginning and at the end of a series of 24 digit periods, the start bit being registered in the register B and the end bit in the register M. In the state P21 the circuit determining the future state indicates the state P0 as future state, independently of the internal conditions of the machine.

The next setting of the flip-flop A10 in the state P21 causes, through the gate 82 of the timing circuit 62, a signal MG which makes the machine pass into the state P0.

INSERTION STAGE

The stage of introduction of a number from the keyboard to the memory relates to the insertion of the digits, and the point and the algebraic sign "—" and occurs in state P0 which follows P21. The numbers are inserted on the keyboard following the decreasing order of the digits, i.e., from the most significant to the least significant, and they are then introduced in the same order into the operating register A, which is the data input register. On inserting the first digit, this will go into the first decimal position of the working register A; inserting next the second digit, this will go into the first decimal position, while the digit previously introduced will be shifted into the second decimal position of the register A, and so on with the successive digits. The numbers introduced have therefore the least significant digit in correspondence with the first decimal position of the register A.

The operations which take place during the stage of introduction of the first digit from the keyboard 45 can be thus synthesized; initially there is a zeroing of the working register M, then a transfer of the numerical content possibly present in the register A to the register M with simultaneous zeroing of the register A; then follows the direct regeneration of the register M and the introduction into the first decimal position of the register A of the first digit inserted, the writing of a bit B2A (indicating a significant digit) and of possible bit B4A (indicating the point) in correspondence with the decimal position into which the digit itself is introduced; following the insertion of the digit, the direct regeneration of the register A is restored.

On depressing the numerical key corresponding to the first decimal digit to be inserted, the contacts associated with the keyboard 44 produce the four binary signals H1, H2, H3, H4 representing the decimal digit, and a signal G1 indicating that the character inserted is a digit inserted on the keyboard 45. All the signals from the keyboard last for more than one memory cycle.

The signals H1, H2, H3 and H4 through the gate 56 are staticized in the stages I1 to I4 of the staticizer 50. The start of the signal G1 sets a series of condition flip-flops which condition the switching network 6 to block the immediate regeneration of the register M, thus causing the zeroing of it, and next to block the immediate regeneration of the register A which is connected with the register M: in this manner, the register A is cancelled, and if this latter contained a number, it will be relocated in M.

The signal G1 also sets the flip-flop A7, and at the first pulse T1 produced by the generator 8 the pulse M4 through the gate 53 permits the transfer of the bits staticized in I1 to I4 into the stages J4 to J7 of the register J. A bit equal to "1" is also written in the stage J1. Then the switching network 6 connects the register J to the register A during the first digit period, and through the effect of the shift impulse M4 the contents of the register J pass respectively into the binary positions T2, T5, T6, T7, T8 of the first decimal position, while the contents of J are cancelled in so far as the input 41 is not fed. The first digit inserted is consequently written in the first decimal position of the register A by means of four bits B5, B6, B7, B8 representing the digit in binary code and by means of a fifth bit B2 indicating a significant digit.

The second digit of the number to be introduced is then inserted into the keyboard, whereby the keyboard produces the signals H1, H2, H3, H4 representing the digit, as well as the signal G1, as for the first digit. The introduction of the second digit takes place, by first shifting by one decimal position the first digit inserted in the register A, in order next to introduce into the first decimal position the second digit now inserted. So as to obtain the shifting by one decimal position, the register A is connected to the register J in a closed ring, whereby the register A is lengthened by one digit period, while all the other registers remain closed on themselves, whereby their contents are continuously regenerated and therefore remains unaltered in the following memory cycles. Any service bits B1 present are regenerated through the control circuit 65.

At the end of the introduction of the second digit there is an immediate regeneration of the fresh content of the register A. The insertion of further digits takes place in an analogous manner.

To insert the point the operator presses the key 47 after having inserted the units digit and thus generates a signal V which last for some memory cycles. The digit signal G1 being absent, the flip-flop A7 is not set, whereby the transfer gate 53 of the staticizer 50 to the register J remains closed. As soon as the service bit B1A = "1" is read by the memory, a flip-flop A80 is set, which is then reset by the next impulse T1, thus remaining set only during the first digit period C1, whereby, in the bit period T3 of the digit period a point B1 = "1" is introduced into the stage J1 of the register J through a gate 81. The point bit is consequently registered in A in the bit period T4 of the digit of the units.

To insert the algebraic sign "–," the operator depresses the key 46, thus generating a signal SN which, through a gate 69, causes the writing of a sign bit in all the decimal positions of the register A.

If, in this state P0, rather than keying in a number on the keyboard 45, a function is keyed in, possibly accompanied by address, on the keyboard 48 or 49, whereby the signal G2 or G3 is present, the four bits H1, H2, H3 and H4 representing the function are transferred, through the gate 56, into the stages I1 to I4 respectively of the staticizer 50 in order to supply to the computer, through the decoder 51, the indication of the keyed-in function F1–F13. If the address represented by the two bits H5 and H6 is also present, these bits are transferred through the gate 57 into the stages I5 and I6 of the staticizer 50, so as to supply to the computer, through the decoder 52, the address Y1–Y3 of the register actually selected.

In addition, whatever function be keyed-in, the start of the signal G2 or of the signal G3 sets the flip-flop A6, whereby when the generator 8 is started, in the state circuit 62 the rising front of the signal A10 produces, through a gate 83, a signal MG commanding the passage to the future state, this future state depending on the particular instruction keyed-in.

The signal MG resets the flip-flop A6 which then has the object of avoiding, during the signal G2 or G3 which lasts for several memory cycles, the production of further undue signals of passage of state MG in the following memory cycles. The instruction thus inserted will be performed in the said future state.

TRANSFER OF A NUMBER FROM ONE REGISTER TO ANOTHER

The transfers between the registers of the memory LDR usually occur in a state P2 of the machine which lasts for a single memory cycle comprised between two successive startings of the oscillator 9. In the state P2, if the instruction Y, F6 is present in the staticizer 50, i.e., if the selected register is the generic register Y and the function staticized is F6, the switching network 6 closes all the registers, other than the register A, on themselves, with the object of ensuring their regeneration, and also connects the output of the selected register Y to the input RA of the register A, whereby the content of the register Y is transferred into the register A in a single memory cycle.

If, on the contrary, the functions part of the instruction present in the staticizer 50 is F7, the switching network 36 closes all the registers, other than the register A and the register M, on themselves, in order to ensure their regeneration, and also connects the outputs of the register A and of the register M to the inputs of the register M and the register A respectively, whereby the contents of the register M are transferred into the register A and vice versa.

In each case, if there is no address specified in the instruction, the address is understood to be the register A.

Whatever may be the instruction actually staticized in the state P2, when the generator 9 is restarted, the gate 84 in the circuit 62 is opened to produce an pulse MG for commanding the change of state, through the effect of which the computer passes to the next state, determined by the nature of the instruction itself.

ALIGNMENT OF THE NUMBERS IN THE MEMORY

As has been seen, the numbers are introduced from the keyboard to the register A without paying attention to their alignment compared with the numbers contained in the other registers. Prior to performing any one of the four basic arithmetical operations, the two numbers involved in it are aligned in the manner briefly indicated here.

As is observed, when a register of the memory LDR is connected to the register J in closed circuit, its contents undergo a delay of one digit period in each memory cycle with respect of the other registers closed on themselves, which are regenerated. Consequently, the connection of the registers having been established by means of the switching network 6, in order to align a number contained in a certain register, for example A, so that its first complete digit with which the point is associated is placed in the first decimal position C1, it will be sufficient to make the computer perform repeated memory cycles in one of its alignment states P3, until in a certain cycle, during the first digit period C1, signalized as has been seen by the reading of a service bit B1B = "1," a point bit B4 = "1" is read in the register A. When such coincidence is established, in a manner known in itself and not illustrated in the diagrams, the flip-flop A6 is set, which in this case signals that the desired alignment has taken place. The flip-flop A6 having therefore been set, in the circuit 62 at the next reading of the first digit of the number A or M the rising front of the signal A01 produces through the gate 86 a pulse MG which makes the computer pass to the following state.

Analogously, in a state P14, a number can be shifted until its most significant digit is situated in the first decimal position C1 of a certain register. In general, by making the most of the service bits, it is clear how it is possible to align the numbers in accordance with various criteria.

INSTRUCTIONS FOR PRINTING WITH OR WITHOUT ZEROING, F*Y AND F Y

These instructions command the printing of the content of the selected totalizing register (B, C or D) which is generically indicated by Y.

Since, according to a preferred feature of the invention, the printing of a number always takes place from the register A, it is first necessary to transfer the contents of the selected totalizing register into the working register A, while the previous contents of A are transferred into M. Furthermore, according as the instruction is for printing with or without zeroing, respectively F*Y and F ◊ Y, the selected register Y is not or is immediately regenerated in such a manner that its contents are zeroed or preserved.

Next, in the stage proper of the printing of the number contained in the register A, the switching network 6 connects the register A to the register J, into which the number to be printed is transferred digit by digit, and the register J is connected to the adder 12 so as to form a counter in the manner already stated in order to count the successive signals CK. Each of the signals CK generated by the printing element 43 makes the contents of the counter increase by one unit. If the code of the character to be printed corresponds to the number *n*, after having received 16–*n* counting signals, the contents of the counter reach the value 16, whereby a binary carry R*b* is produced in the adder. It is evident from what has been stated about the arrangement of the characters round the cylinder that, the said carry is adapted to command the activation of the hammer through a gate 90 in a manner known in itself, in so far as the character corresponding to the said number *n* appears just then beneath the hammer.

A more detailed description of the printing procedure appears in Italian Pat. No. 716,538 where the printing of an instruction and an address introduced into the staticizer 50 is also described.

INSTRUCTIONS FOR ALGEBRAIC TOTALING F+Y, F–Y

These instructions command the algebraic addition and subtraction of the number contained in A, and possibly inserted by the keyboard, with that content in the selected totalising register (B, C or D) which is generically indicated by Y.

The addition and subtraction of two numbers contained respectively in the registers A and Y take place according to the rule that an addition is effectively performed if, the instruction being of addition F+Y, the signs of the numbers A and Y are in agreement or if, the instruction being of subtraction F–Y, the signs are not in agreement. In the other cases a subtraction is effectively performed. A detailed description of the procedure of addition and subtraction appears in Italian Pat. No. 716,358. It is sufficient here to summarize the sequence of the states.

Figure 8A:
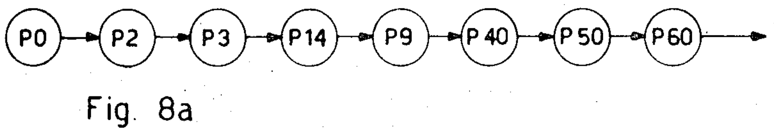
FIGS. 8*a* and 8*b* represent sequences of states of the computer.

When the instruction F+Y of addition of F–Y of subtraction is staticized in the instructions staticizer 16, the computer is adapted, under the control of the sequence circuit, to run through automatically a predetermined sequence of states, which is that schematized in FIG. 8*a*. In particular, starting from the state PO in which the said instruction is keyed-in in the keyboard, the sequence for addition or subtraction comprises:

The state P2, in which the contents of the selected register Y by means of the instruction are transferred into A while the contents of A are transferred into M;

The states P3 and P14, in which the numbers now contained in the registers A and M respectively are aligned, with the point arranged in the decimal position C1 of the respective register;

The state P9, in which it is ascertained whether the signs of the two numbers A and M agree or not;

The state P40, in which it is ascertained which of the two numbers A and M is the greater;

The state P50, in which the two numbers are added and the result is registered in A;

The state P60, in which the sum thus obtained is corrected to pass from the binary code to the decimal binary code, adding "+6" supplied by a circuit 75 to all those figures of the result which have given rise to a decimal carry.

At the end of the addition, the result contained in A is transferred into Y, while the addend originally transferred from A into M is restored to A.

Prior to commencing the sequence of states described, the printing of the content of the register A which contains the addend previously inserted is also performed.

INSTRUCTION FR FOR PRINTING OF THE REGISTER R

This instruction commands the printing of the content of the working register R, recalling it into the register A, while the previous content of the register A is directly regenerated. The sequence of the states is analogous to that of the instruction for printing without zeroing of the totalizer.

INSTRUCTION F< FOR DESIGNATION OF THE PRIME TERM

This instruction is inserted to signalize the end of the introduction of a number into A and causes the printing thereof. When a numerical key is operated the register A is cleared, as described in the section "Insertion Stage," and its contents transferred to the register M.

If this instruction is keyed-in without previous insertion of a number, an exchange of contents between A and M is performed and then printing the fresh contents of A. In the printing stage the sequence of the states is analogous to that of the instruction for printing without zeroing.

If the instruction F< is also accompanied by the activation (immediately before or simultaneous) of the key " || " of connection with the register C, whereby this totalizing register is addressed, the data contained in the working register A is transferred into the totalizer C. The totalizing register C is previously zeroed for such purpose and the content of A is then transferred into it, which in its turn is immediately regenerated. The content of A is then printed.

INSTRUCTION FOR MULTIPLICATION F × AND FOR DIVISION F

Multiplication is obtained with repeated additions, each obtained by means of a cycle of states identical with that for the operation of addition. The repetition of the cycle occurs automatically, until the number of additions indicated by the multiplier figure is attained.

In normal multiplication, performed manually, the multiplicand is multiplied by each of the digits of the multiplier and the partial results are added together suitably aligned, to take into account that they have been obtained from the digit of the units of the tens, the hundreds etc., of the multiplier. The machine follows an analogous procedure.

Supposing then that the two operands have been keyed-in, so that the multiplicand is in A and the multiplier is contained in M, the alignment of the multiplicand and the multiplier is performed, then the content of A is transferred into the working register R, complementing it and leaving only the service bits in A.

A "+1" is then added to the number of the register R in correspondence with the point of M, and the addition of the contents of A and of M is next performed, registering the result in A. A "+1" is then added to R and the addition of the contents of A and M is then again performed. The procedure is repeated until the figure in R in correspondence with the point of M reaches the full-house value 16 and an "0" is consequently formed at the position of that figure in R, while the carry is blocked. The preceding position to full-house causes a relative shift of M in respect of the registers R and A, delaying these latter by one decimal position.

A "+1" is then added to the digit of R which is now in correspondence with the point of M and the addition of the contents of A and M is next performed registering the result in A; and so on, as described, until there are all zeros in R, a condition which concludes the multiplication. It is easy to verify that such a method follows that in manual use, adapted to the operation of the machine.

These two cases can occur: the command for the operation "×" occurs following a numerical insertion from the keyboard, or else the command for the operation "×" is not preceded by a numerical insertion. In the first case, the number introduced into A prior to the command for "×" is designated as a multiplier and after having been printed it is transferred into M, while the multiplicand formed by the number previously introduced into M is transferred into A. In the second case, the multiplier is formed by the number already contained in M, which after the insertion for the operation "×," is transmitted into A to be printed, then carried forward into M for the performance of the operation; at the same time, the number contained in A is transferred into M and then carried forward into A.

At the end of the operation, the result is in A and is automatically printed; in M the multiplier is unchanged, while the multiplicand is destroyed.

Figure 8B:
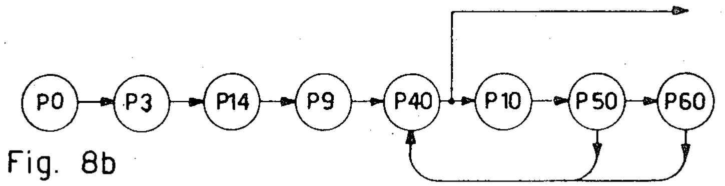

A sequence of states which carries out a procedure analogous to that just expounded is described in detail in Italian Pat. No. 716,538, and is summarized and recapitulated here with special reference to the diagram in FIG. 8*b*. The sequence of states which the computer performs commencing with the state P0 is, for example, as follows:

The state P3, in which the number contained in the register A (multiplicand) is shifted until its first complete digit, containing the point bit B4 = "1," is in the first decimal position C1 of the register A;

The state P14, in which the number contained in the register M (multiplier) is shifted until its most significant figure is in the first decimal position C1 of the register M;

The state P9 (one memory cycle) in which it is verified if the signs of the two factors agree, while the content of the register A (multiplicand) is transferred into the register R, to permit the register A then to accumulate the product;

The state P40 (one memory cycle) in which it is ascertained which of the two numbers M and R is the greater (which has no significance in multiplication, but has in division);

The state P10 (one memory cycle), in which the digit of the multiplicand which is in the same decimal position as the point of the multiplier is identified by one unit, while the multiplicand itself is delayed by one digit period;

The state P50 (one memory cycle), in which the multiplier M is added to the number contained in the registered A and the relative sum is thus registered in A;

The state P60 (one memory cycle), in which the correction from the binary code to the binary-decimal code of the said sum is performed.

The machine returns from this state P60 into the state P40, in order to repeat the subsequence P40, P10, P50, P60, which is collectively run through *n* times if *n* is the most significant figure of the multiplicand. It is to be noted that the numbers contained in the registers R, A and M are delayed by one digit period, i.e., shifted to the most significant positions, in the states P10, P50 and P60 respectively, whereby their alignment is restored after each of the said subsequences P40, P10, P50, P60. After the *n*th of the said subsequences, with the object of shifting the multiplicand (register R), and the partial product (register A) by one decimal position to the most significant positions, a reduced subsequence is performed comprising the states P40, P10, P50 in which, during the state P50, contrary to normal, the register M is not connected to the adder, whereby the number N is shifted without being altered.

The *n* subsequences P40, P10, P50, P60 are then performed, if *n* is the second most significant digit of the multiplier, and so on.

Division is obtained in an analogous manner by repeated subtractions, and the end of the operation is command by attaining the number of decimals desired. The procedure can be summarized thus.

Supposing that the two operands have been inserted, so that the dividend is in A and the divisor is contained in M, the alignment of the dividend and of the divisor is performed. Then an examination is made to see if A is greater than, equal to or less than M. A "+1" is added if A ≥ M to the register R in correspondence with the point of M. Then the difference between the contents of A and of M according to the internal subtraction rules is performed and a return is made to collate M with A, which now contains the result of the difference performed.

If it is still A ≥ M, "+1" is added to R, and this procedure is followed until A becomes less than M. During these cycles A, M and R are delayed, but keeping them in mutual alignment. When A is less than M, the difference is not performed, but a relative shift of M in respect to A and R is caused, and the procedure is repeated.

INSTRUCTION FOR SQUARE F□

This instruction commands the calculation of the square of an operand inserted in the register A. The procedure observed is as follows.

The register M is first cancelled and the content of A is then transferred into M, while A is immediately regenerated. The following logical sequences are identical with those for multiplication, and at the end the result will be found in A and will be automatically printed. The original operand will, on the contrary, be found in M.

INSTRUCTION FOR SQUARE ROOT F

This instruction commands the calculation for the square root of the operand contained in the register A. The result is registered in A and then automatically printed, while the duplicate of the result is formed in M.

The method used for obtaining the square root of a number is, for example, as follows.

Supposing that the radicand, of which the root is required, is in the register A, the register M is zeroed and there is then registered in M a "1" which will be aligned beneath the most significant digit of the radicand, if it has a number of odd complete digits, or beneath the second digits if its complete digits are even. Successive subtractions of increasing odd numbers (1, 3, 5, 7 etc.) are then performed, inserted from time to time in M until reaching the position of A<M; the succession of the odd digits to be subtracted is obtained by adding "+2" each time to the content of M. The counting of the number of subtractions is carried forward into R, and this forms the result of the square root operation. The operation ceases when the number of decimals desired for the result is attained.

INSTRUCTION FOR PERCENTAGE CALCULATION F%

This instruction permits, by means of the operation of a single functional key, the performance on two numbers *a* (nominal value) and *b* (rate of discount or premium) of the following successive operations: $(a\times b)/100$ i.e., percentage discount or premium $a\pm(a\times b)/100$ i.e., total discounted or increased.

Two cases can be given: the command for the operation "%" after the numerical insertion, or without previous numerical insertion.

In the first case, the machine performs the calculation of the discount or premium of the total previously inserted in A, and which is then transferred into M when the negative or positive rate is inserted in A, by the keyboard.

In the second case, the machine designates as rate of discount or premium the datum contained in M, and as nominal in value (i.e., as total to be discounted or increased) the datum contained in A.

The total discounted or increased at the end of the operation appears and A and is redesignated as prime operand for further calculations, while the original total appears in M.

The activation of the key "%" also automatically causes the ensuing printing of the rate (of discount or premium), of the rate or premium percent and of the discounted or increased total.

INSTRUCTION FOR TOTALING THE PRODUCTS F Σ P AND OF THE QUOTIENTS F Σ Q

The instruction for the totaling of the products causes the performance of a multiplication operation between the two operands contained in the registers A and M, and then an algebraic totaling of the product for example in the third totalizer. The relative logical sequences are identical with that of multiplication followed by that of addition.

The instruction for totaling of the quotients causes the performance of a division operation between the two operands contained in the registers A and M, and then an algebraic totaling of the quotient for example in the third totalizer. The relative logical sequences are identical with that of division followed by that of addition.

INSTRUCTIONS ACCOMPANIED BY THE KEY " || " CONNECTING WITH THE TOTALIZING REGISTER C

The instructions F×, F; F%, F P and F Q can be accompanied by the immediately previous or simultaneous operation insertion of the key connecting with the register C, designated by the notation " || "

These instructions accompanied by the addressing of the register C designate the content of the said register C as second operand in the performance of the relative function. The content of C is first transferred into A, with a logical sequence identical with that of the function F+, and imitating in all effects an insertion by the keyboard. The logical sequences proper to the instructions inserted are then carried out. Thus the contents of A is transferred to M and the operands in A and M (originally in C and A respectively) are combined according to the selected function key and the result is entered in A (and totaled in C if FP or FQ was operated).

We claim:

1. An electronic computing arrangement including a plurality of registers and input/output elements comprising:

- a first and a second operating register for containing numbers;
- a control keyboard including a first group of function keys and a plurality of numbers keys;
- means, responsive to the operation of one or more of said number keys, for entering a current number into said first register;
- execution means, responsive to the operation of any one of said first group of function keys, for altering the current number in said first operating register in accordance with the operated function key, said altered number remaining in said first register; and,
- transfer means, also responsive to the operation of said operated one of said first group of function keys, for transferring said current number in said first register to said second register.

2. An electronic computing arrangement according to claim 1, including at least one totalizing register and a second group of function keys in said control keyboard and wherein said executing means includes means, responsive to the actuation of any one of said second group of function keys for algebraically combining the current number in said first operating register and a number in said totalizing register with the result of said combination remaining in said totalizing register and with the current number in said first operating register remaining unchanged.

3. An electronic computer according to claim 2, wherein said control keyboard includes at least one result totalizing key means for activating both said executing means and said algebraic combining means with said executing means causing a mathematical operation, designated by said result key, to be performed on the numbers of said first and second operating registers with the result of said operation located in said first register and with said algebraic combining means causing said result to be algebraically combined with the number in said totalizing register.

4. An electronic computer according to claim 2, wherein said control keyboard includes a selection key means and wherein said transfer means includes means which, when said selection key is activated simultaneously with, or immediately prior to, the activation of at least one key of said first group, causes the number in said totalizing register to be transferred to said first register, said transferred number being combined with the number in said second register in accordance with said key of said first group with the result remaining in said first register.

5. An electronic computer according to claim 1, including at least one totalizing register and a third group of function keys and wherein said executing means includes means, responsive to the actuation of any one of said third group, for transferring the number in said totalizing register into said first register while setting the current number originally in said first register into said second register.

6. An electronic computer according to claim 5, wherein said third group includes at least one print key, and wherein said output element includes a printer, the operation of said print key causing said printer to print out the number which has been transferred from said totalizing register to said first register.

7. An arrangement according to claim 1, wherein said keyboard includes an exchange key and wherein said transfer means includes means for exchanging the numbers in said first and second registers, said exchange means being activated only when said exchange key is operated immediately subsequent to the operation of nonnumerical key.

8. An arrangement according to claim 7 including:

- means, responsive to the key operation sequence: number key—exchange key—number key, for removing the current number entered into the first operation register prior to the operation of the exchange key and placing said current number unaltered into the second operating register.

9. The arrangement according to claim 8, including a totalizing register and wherein said control keyboard includes a selection key associated with said totalizing register and wherein said transfer means includes means, operative when said selection key is operated simultaneously with, or immediately prior to, the operation of said exchange key for causing the number in said first operation register to be reproduced in said totalizing register.

10. An electronic computing arrangement according to claim 1, including:

- means, responsive to the operation of one of said number keys subsequent to the operation of one of the function keys, for removing the number from said first register and placing the removed number in said second register.

* * * * *